T. BYRNE.
Preserving Flour.
No. 29,859.  Patented Sept. 4, 1860.
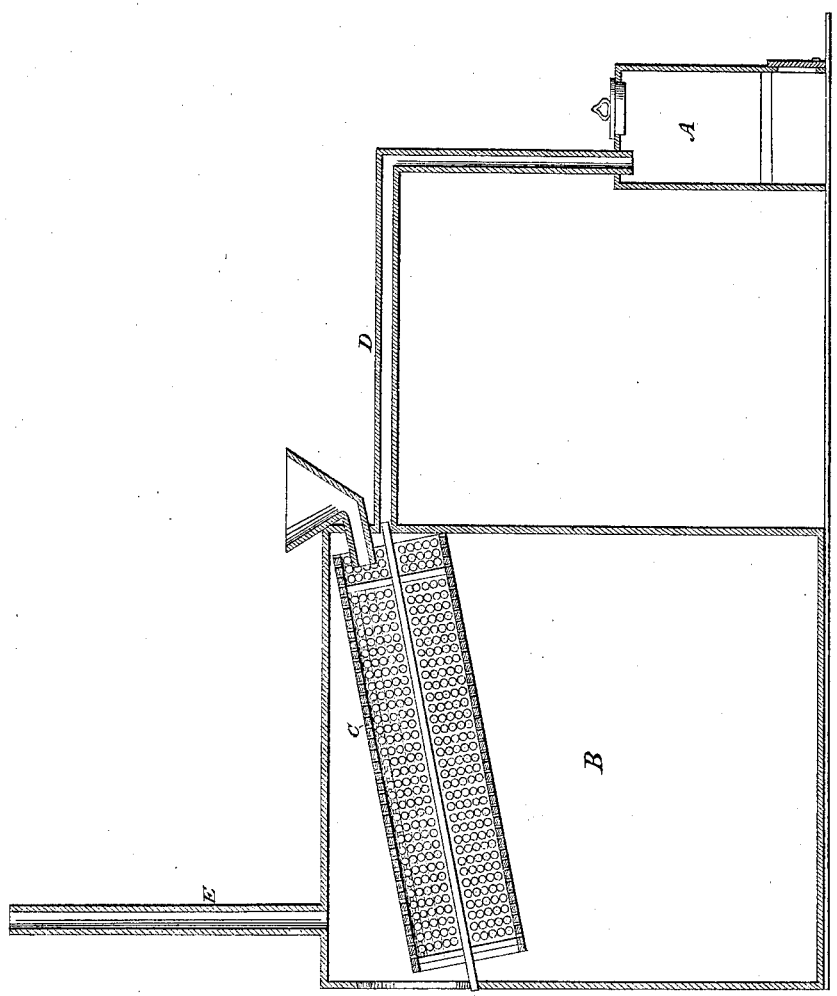
Witnesses:
Goodwin y aBee
G.F.G. Dieterich.
Inventor:
Thos Byrne
by Munn & Co
Attorney.

UNITED STATES PATENT OFFICE.

THOMAS BYRNE, OF BATON ROUGE, LOUISIANA.

PREPARATION OF FLOUR.

Specification of Letters Patent No. 29,859, dated September 4, 1860.

*To all whom it may concern:*

Be it known that I, THOMAS BYRNE, of Baton Rouge, in the parish of East Baton Rouge and State of Louisiana, have invented a new and Improved Process of Treating Flour with Carbonic-Acid Gas; and I do hereby declare that the following is a full, clear, and exact description of the same, reference being had to the accompanying drawings, forming a part of this specification, in which a sectional view of an apparatus adapted for performing my invention is represented.

It is a well known fact to dealers in flour, that the flour of wheat when freshly ground is unfit for the use of bakers, as it makes a much smaller loaf than when it has acquired some age. It is also well known that too much age causes decomposition, the flour generates animalcules and becomes unfit for any use except starch manufacture. As a remedy for these evils, I treat freshly ground flour with carbonic acid gas. It renders fresh flour fit for immediate use and prevents flour at a far advanced age from decomposition.

The nature of my invention consists in treating the flour of wheat and other grains with carbonic acid gas, substantially as hereinafter described.

To enable others, skilled in the art, to make and use my invention I will proceed to describe the construction and operation of an apparatus adapted to the working of the same.

A, is a stove or retort for generating the carbonic acid gas.

B, C, represent an ordinary flour bolting chest, and C, the bolting cylinder.

D, is a pipe for connecting and forming a communication between the stove and the bolting machine, and E a pipe at the top of the bolting machine for creating a draft from the stove through the bolting chest B. The pipe D, near the bolting chest, may be kept cool by means of a water jacket.

To operate with this apparatus charcoal, coke or anthracite coal is placed in the stove and ignited. The flour is introduced into the bolting chest and agitated by the bolting cylinder; the gas being induced to enter into the bolting chest by reason of draft of pipe E, a thorough mingling between it and the separated or agitated flour is accomplished.

I find that when freshly ground flour is exposed to the action of carbonic acid gas, it holds some portion of it mechanically mixed with it, even after having been removed from the gas and exposed to the atmosphere. This action may be referred to the property which solid bodies, in a porous or in a finely divided condition, have, of attracting gases and of holding them condensed on their surface, especially if these gases are susceptible of being absorbed. When flour, thus holding carbonic acid, is closely packed it will retain it for a long time, and its presence, by excluding the oxygen of the air, would tend to prevent chemical change.

My process only includes the treatment of the flour of wheat and other grains, and by it I believe such reduced substances can be perfectly supplied with the necessary qualities for keeping long, and making good bread or meal.

I do not limit myself to any method of generating carbonic acid gas, nor to any method of applying it to flour, &c., as these can be modified indefinitely.

What I claim is—

The bringing of flour of wheat and other grains in contact with carbonic acid gas, artificially manufactured.

THOS. BYRNE.

Witnesses:
GOODWIN Y. AT LEE,
ROBT. W. FENWICK.